US009285550B2

(12) United States Patent
Nhep et al.

(10) Patent No.: US 9,285,550 B2
(45) Date of Patent: Mar. 15, 2016

(54) FIBER OPTIC CONNECTOR WITH ROTATIONAL INTERLOCK BETWEEN CONNECTOR HOUSING AND REAR INSERT

(71) Applicant: ADC Telecommunications, Inc., Berwyn, PA (US)

(72) Inventors: Ponharith Nhep, Savage, MN (US); Marlon E. Holmquist, Gibbon, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/519,540

(22) Filed: Oct. 21, 2014

(65) Prior Publication Data

US 2015/0110449 A1   Apr. 23, 2015

Related U.S. Application Data

(60) Provisional application No. 61/893,590, filed on Oct. 21, 2013.

(51) Int. Cl.
G02B 6/38          (2006.01)
(52) U.S. Cl.
CPC .............. *G02B 6/3858* (2013.01); *G02B 6/381* (2013.01); *Y10T 29/49826* (2015.01)
(58) Field of Classification Search
None
See application file for complete search history.

(56) References Cited

U.S. PATENT DOCUMENTS

| 5,212,752 | A  | 5/1993  | Stephenson et al. |
|-----------|----|---------|-------------------|
| 8,636,425 | B2 | 1/2014  | Nhep              |
| 8,702,323 | B2 | 4/2014  | Nhep              |
| 2008/0240658 | A1 | 10/2008 | Leeman et al.  |
| 2011/0229085 | A1 | 9/2011  | Bradley et al. |
| 2012/0170896 | A1 | 7/2012  | Skluzacek et al. |
| 2014/0254988 | A1 | 9/2014  | Nhep           |

FOREIGN PATENT DOCUMENTS

KR       10-1248591 B1    3/2013

OTHER PUBLICATIONS

International Search Report and Written Opinion for Application No. PCT/US2014/061515 mailed Jan. 12, 2015.

*Primary Examiner* — Jerry Rahll
(74) *Attorney, Agent, or Firm* — Merchant & Gould P.C.

(57) ABSTRACT

The present disclosure relates to a fiber optic connector including a connector housing having a distal end and a proximal end. The distal end can form a plug portion adapted for insertion within a receptacle of a fiber optic adapter. A rear insert mounts within the proximal end of the connector housing. An axial insertion/retention interface can be defined between the connector housing and the rear insert. The axial insertion/retention interface can be configured to allow the rear insert to be inserted into and removed from the proximal end of the connector housing along an insertion axis when the rear insert is positioned in a first rotational position about the insertion axis relative to the connector housing. The axial insertion/retention interface can also be configured to prevent the rear insert from being withdrawn from the proximal end of the connector housing along the insertion axis.

10 Claims, 11 Drawing Sheets

FIG. 13

FIBER OPTIC CONNECTOR WITH ROTATIONAL INTERLOCK BETWEEN CONNECTOR HOUSING AND REAR INSERT

CROSS-REFERENCE TO RELATED APPLICATION

The present patent application claims the benefit of U.S. Provisional Patent Application Ser. No. 61/893,590, filed Oct. 21, 2013, which application is hereby incorporated by reference in its entirety.

TECHNICAL FIELD

The present disclosure relates generally to optical fiber communication systems. More particularly, the present disclosure relates to fiber optic connectors used in optical fiber communication systems.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of an intermediate fiber optic adapter.

A fiber optic connector is often secured to the end of a corresponding fiber optic cable by anchoring strength members of the cable to the connector housing of the connector. Anchoring is typically accomplished through the use of conventional techniques such as crimps or adhesive. Anchoring the strength members of the cable to the connector housing is advantageous because it allows tensile load applied to the cable to be transferred from the strength members of the cable directly to the connector housing. In this way, the tensile load is not transferred to the ferrule assembly of the fiber optic connector. If the tensile load were to be applied to the ferrule assembly, such tensile load could cause the ferrule assembly to be pulled in a proximal direction against the bias of the connector spring thereby possibly causing an optical disconnection between the connector and its corresponding mated connector. Fiber optic connectors of the type described above can be referred to as pull-proof connectors.

A number of factors are important with respect to the design of a fiber optic connector. One aspect relates to ease of manufacturing and assembly. Another aspect relates to connector durability and reliability.

SUMMARY

One aspect of the present disclosure relates to a fiber optic connector having features that facilitate connector assembly.

One aspect of the present disclosure relates to a fiber optic connector including a connector housing having a distal end and a proximal end. The distal end can form a plug portion adapted for insertion within a receptacle of a fiber optic adapter. A rear insert mounts within the proximal end of the connector housing. An axial insertion/retention interface can be defined between the connector housing and the rear insert. The axial insertion/retention interface can be configured to allow the rear insert to be inserted into and removed from the proximal end of the connector housing along an insertion axis when the rear insert is positioned in a first rotational position about the insertion axis relative to the connector housing. The axial insertion/retention interface can also be configured to prevent the rear insert from being withdrawn from the proximal end of the connector housing along the insertion axis when the rear insert has been inserted into the proximal end of the connector housing and then rotated relative to the connector housing about the insert axis from the first rotational position to a second rotational position. The axial insertion/retention interface can be defined between the connector housing and the rear insert. The rotational locking/unlocking interface can be configured to allow the rear insert to rotate relative to the connector housing about the insertion axis when the rear insert is positioned in a first axial position along the insertion axis relative to the connector housing. The rotational locking/unlocking interface can be configured to prevent the rear insert from rotating relative to the connector housing about the insertion axis when the rear insert is moved from the first axial position along the insertion axis to a second axial position along the insertion axis while the rear insert is in the second rotational position.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

DETAILED DESCRIPTION

Figure 1:
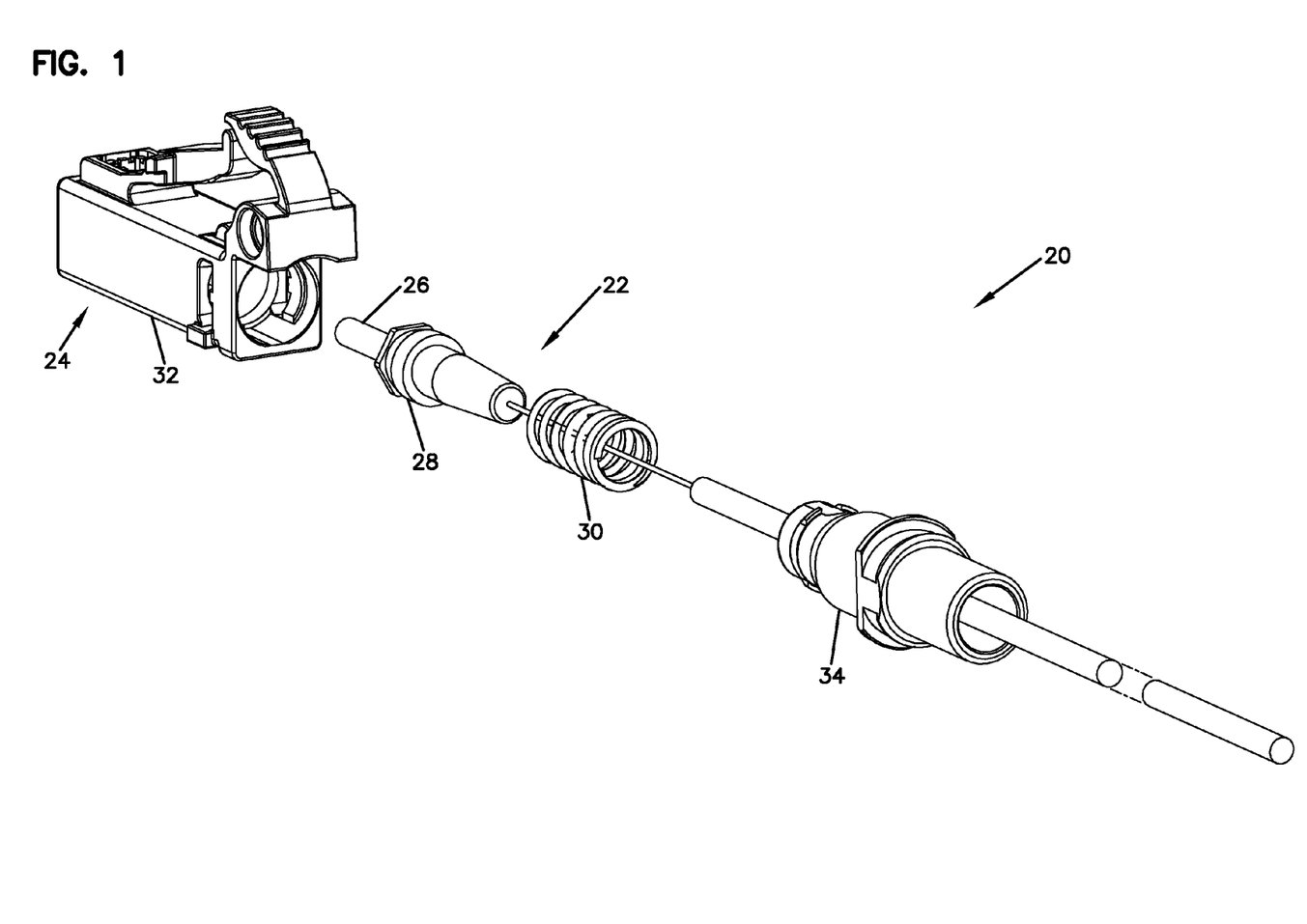
FIG. 1 is a perspective, exploded view of a fiber optic connector in accordance with the principles of the present disclosure.
Figure 2:
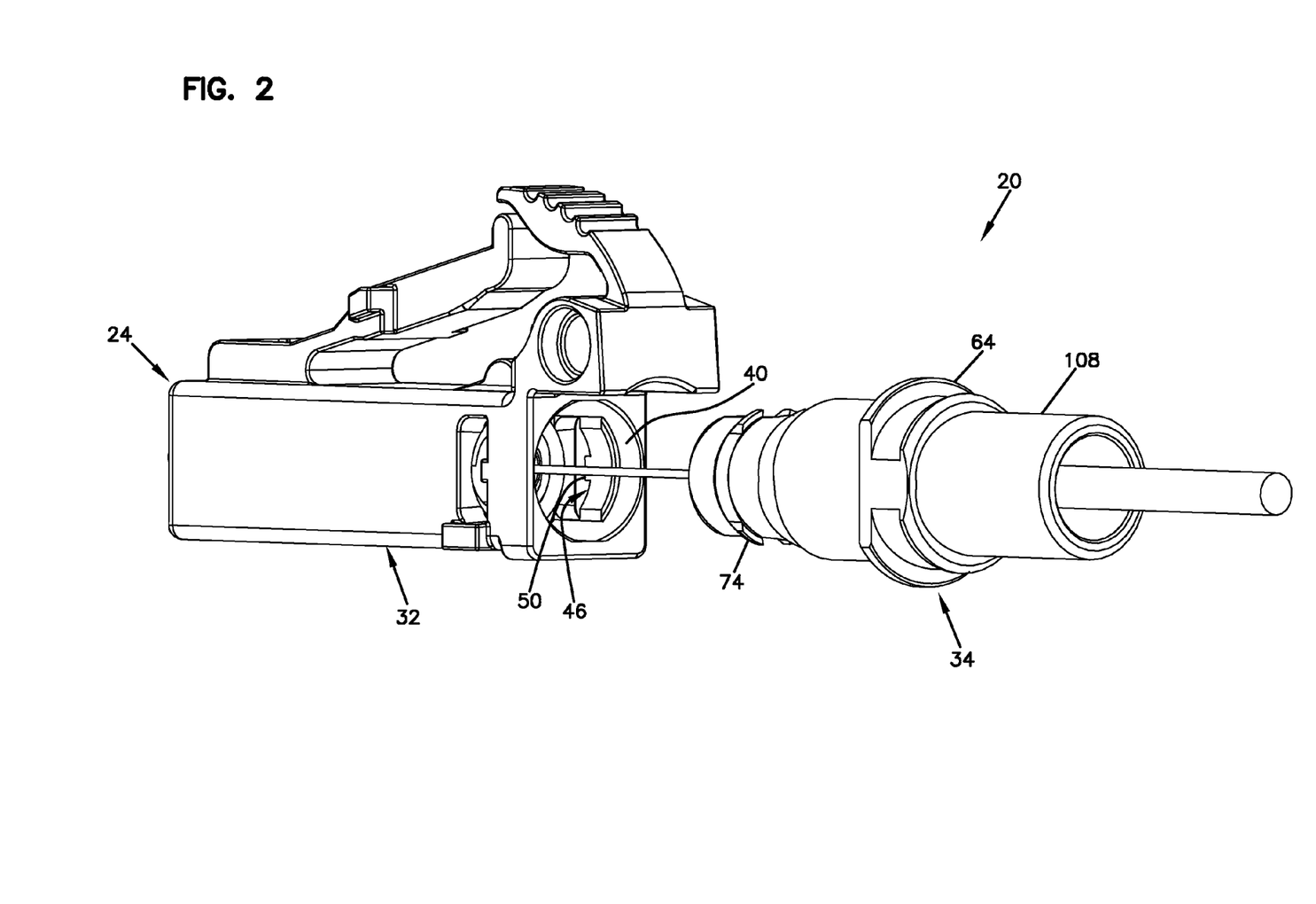
FIG. 2 is a partially assembled perspective view of the fiber optic connector of FIG. 1.

FIGS. 1 and 2 illustrate a fiber optic connector 20 in accordance with the principles of the present disclosure. The fiber optic connector 20 includes a ferrule assembly 22 that mounts adjacent a distal end 24 of the fiber optic connector 20. The ferrule assembly includes a ferrule 26, a hub 28 and a spring 30. The ferrule assembly 22 mounts at least partially within a front connector housing 32 that interconnects with a rear insert 34. Upon assembly, the ferrule assembly 22 is captured between the connector housing 32 and the rear insert 34 (see FIGS. 3 and 4).

Figure 3:
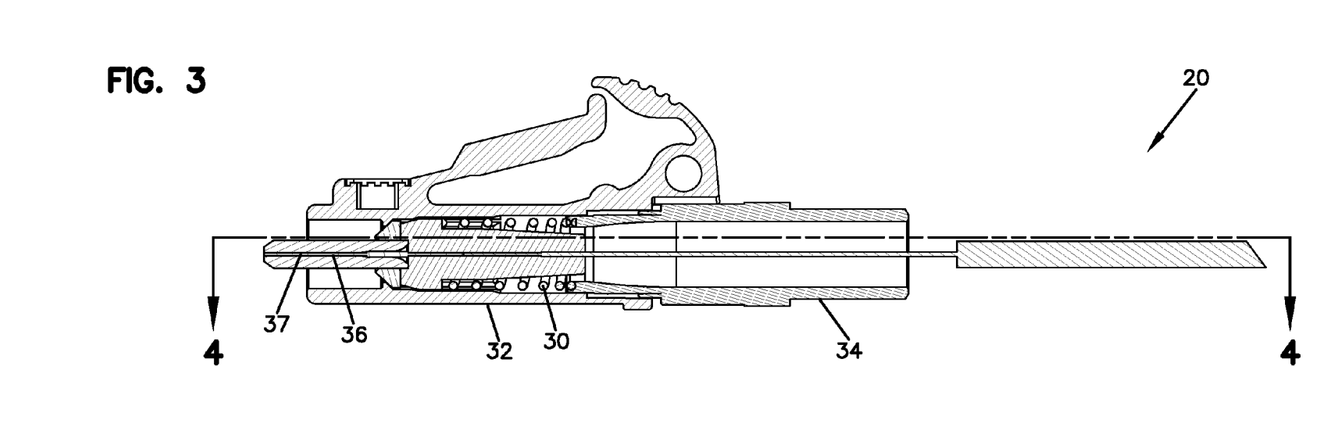
FIG. 3 is a cross-sectional view that longitudinally bisects the fiber optic connector of FIG. 1.
Figure 4:
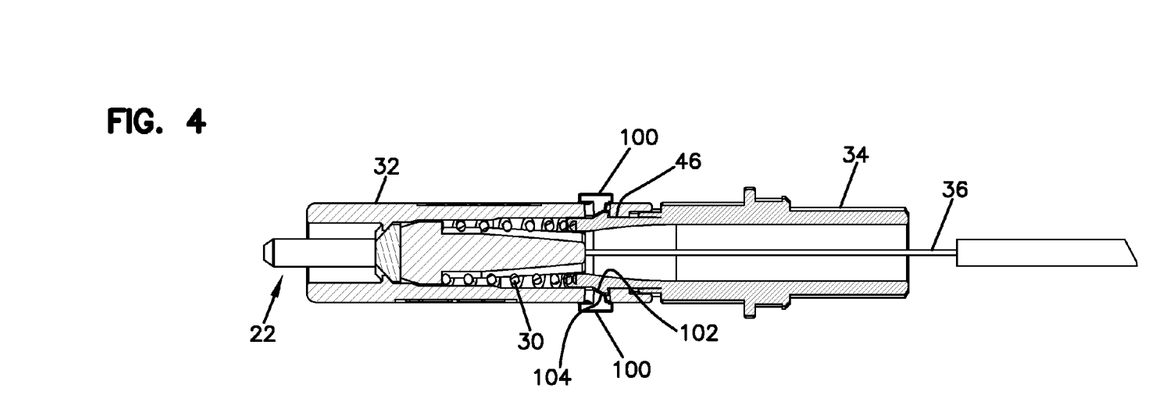
FIG. 4 is a cross-sectional view taken along line 4-4 of FIG. 3.

Referring to FIGS. 3 and 4, an optical fiber 36 is shown routed through the fiber optic connector 20 and includes a distal portion 37 secured within the ferrule 22. The fiber optic connector 20 can further include a strain relief boot (not shown) for providing strain relief and bend radius protection to the optical fiber 36. In certain examples, the fiber 36 can be part of a fiber optic cable including a jacket, protective buffer layers and one or strength members for providing compressive and/or tensile reinforcement to the cable.

Figure 5:
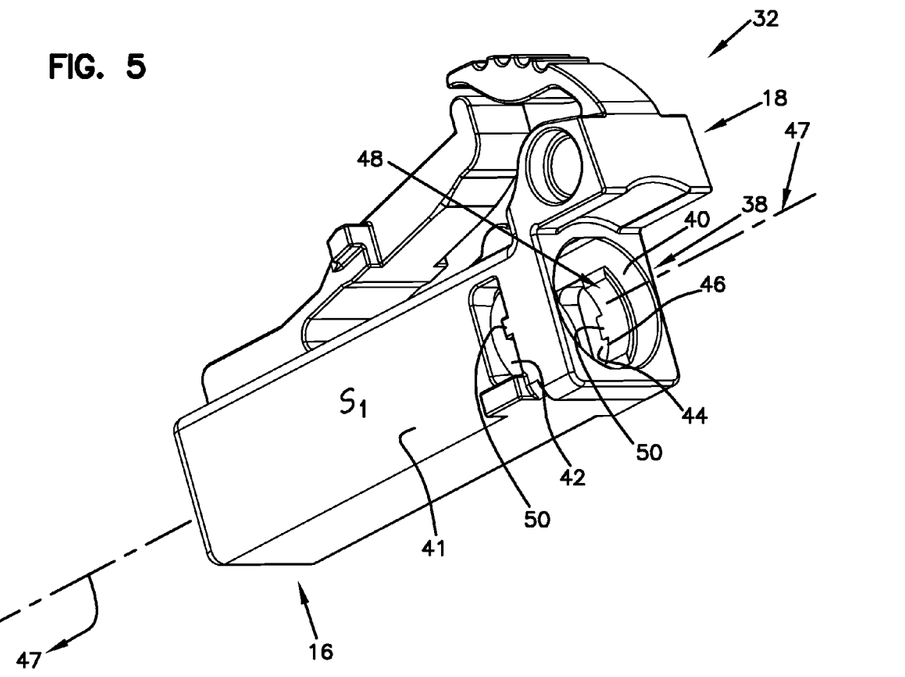
FIG. 5 is a perspective view of a connector housing of the fiber optic connector of FIG. 1.
Figure 6:
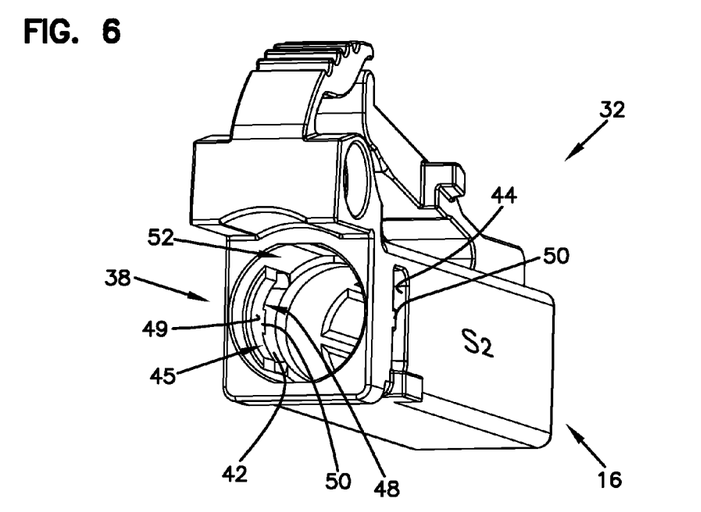
FIG. 6 is a rear view of the connector housing of FIG. 5.

Referring to FIGS. 5 and 6, the example front connector housing 32 is shown including a distal end 16 and a proximal end 18. The front connector housing 32 can be generally rectangular in shape and can include a left side wall $S_1$ that opposes a right side wall $S_2$, and a top side wall $S_3$ that opposes a bottom side wall $S_4$. The front connector housing 32 is shown defining left and right openings 42, 44 respectively defined at the left and right side walls $S_1$, $S_2$ of the housing 32. The left and right openings 42, 44 extend through the side walls $S_1$, $S_2$ from an interior 40 to an exterior 41 of the front connector housing 32. The proximal end 18 of the front connector housing 32 can define a rear opening 38 for accessing the interior 40.

Figure 12:
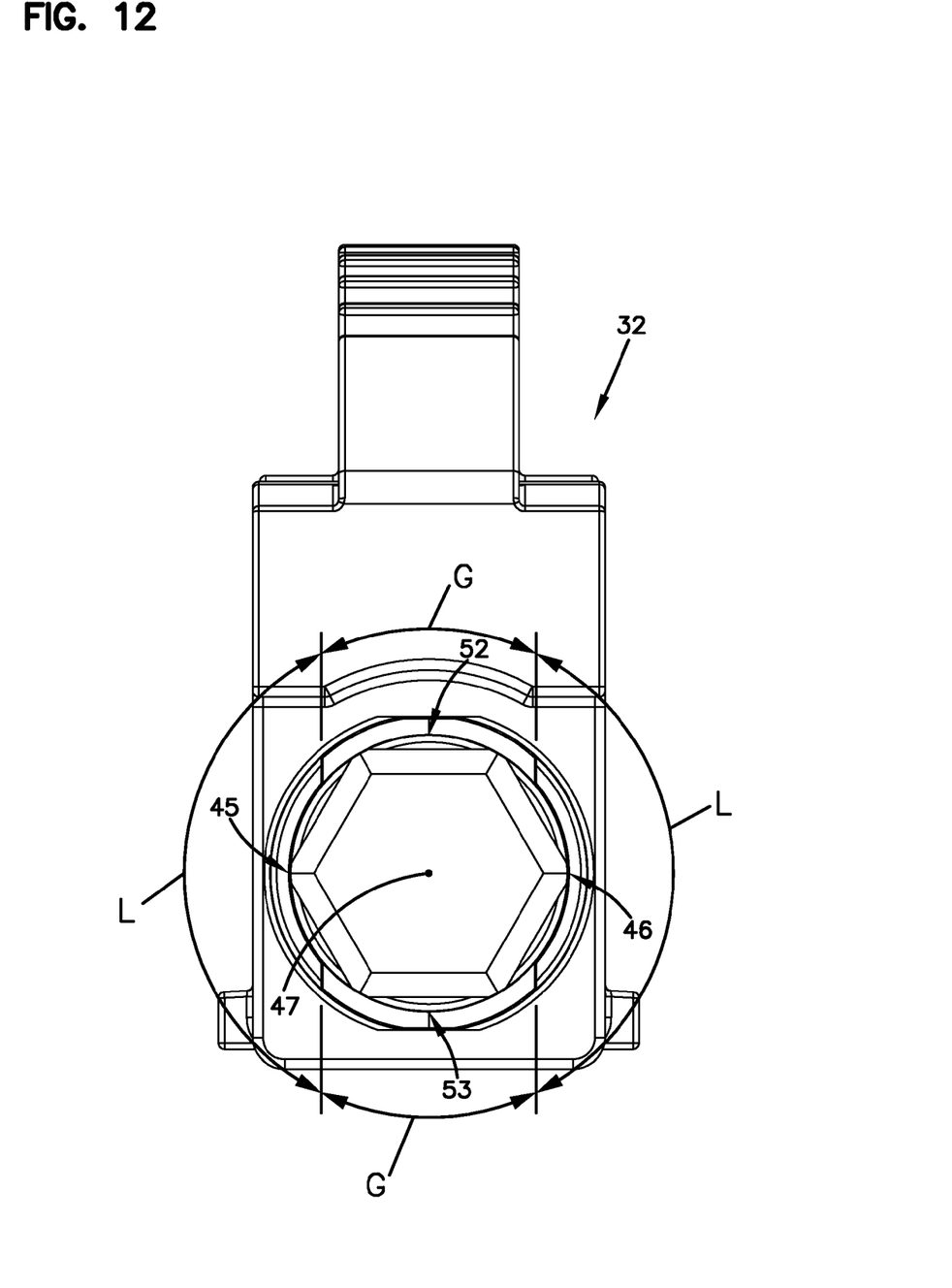
FIG. 12 is a rear end view of the front connector housing of the fiber optic connector of FIG. 1.

In one example, the connector housing 32 can include left and right retention structures 45, 46 (see FIGS. 5, 6 and 12) positioned within the interior 40 of the front connector housing 32 adjacent to the proximal end 18 of the connector housing 32. As depicted, the left and right retention structures 45, 46 respectively project radially inwardly from the left and right side walls $S_1$, $S_2$ toward a central axis 47 of the connector housing 32. The left and right projection structures 45, 46 project towards each other into the interior 40 of the connector housing 32. In one example, the left retention structure 45 can be positioned adjacent to the left opening 42 and the right retention structure 46 can be positioned adjacent to the right opening 44. In one example, the left and right retention structures 45, 46 can include rails 49 defining distally facing retention shoulders 48. The left and right retention structures 45, 46 can also include tabs 50 that project distally from the retention shoulders 48. In certain examples, the connector housing 32 can define upper and lower gaps 52, 53 (see FIG. 12) located between the left and right retention structures 45, 46 adjacent the proximal end 18 of the connector housing 32. As shown at FIG. 12, the upper and lower gaps 52, 53 each define a gap width G and the left and right retention structures 45, 46 each define a structure length L. The gap width G and the structure length L are measured in a circumferential orientation relative to the axis 47.

Figure 7:
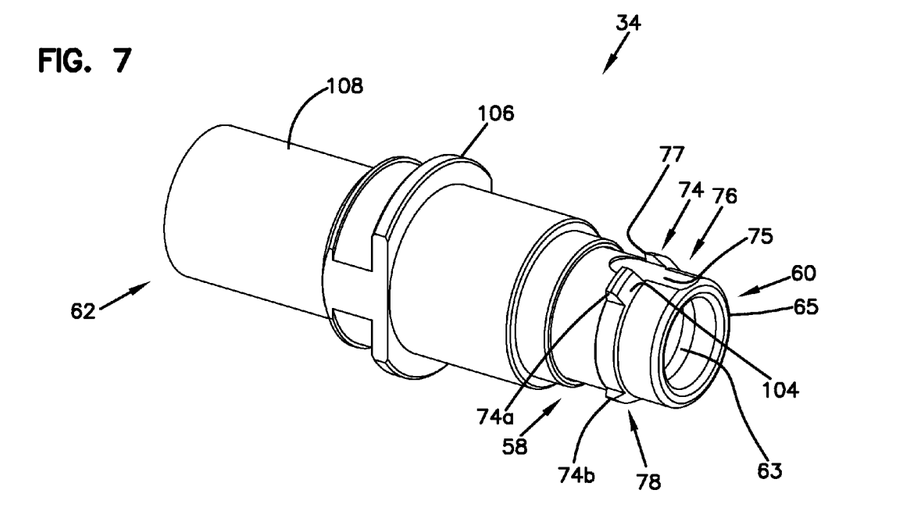
FIG. 7 is a perspective view of a rear insert of the fiber optic connector of FIG. 1.

FIG. 7 is a perspective view of the rear insert 34. The rear insert 34 is adapted to couple to the proximal end 18 of the front connector housing 32. The rear inert 34 includes a distal end 60 and a proximal end 62. The rear insert 34 defines a through-passage 63 that extends through the rear insert 34 from the proximal end 62 to the distal end 60. The distal end 60 of the rear insert 34 defines a spring stop 65 that abuts against a proximal end of the spring 30 (see FIGS. 3 and 4) when the rear insert is installed in the rear of the front connector housing 32. In this way, the rear insert 34 functions to capture/trap the ferrule assembly 22 within the front connector housing 32.

Figure 13:
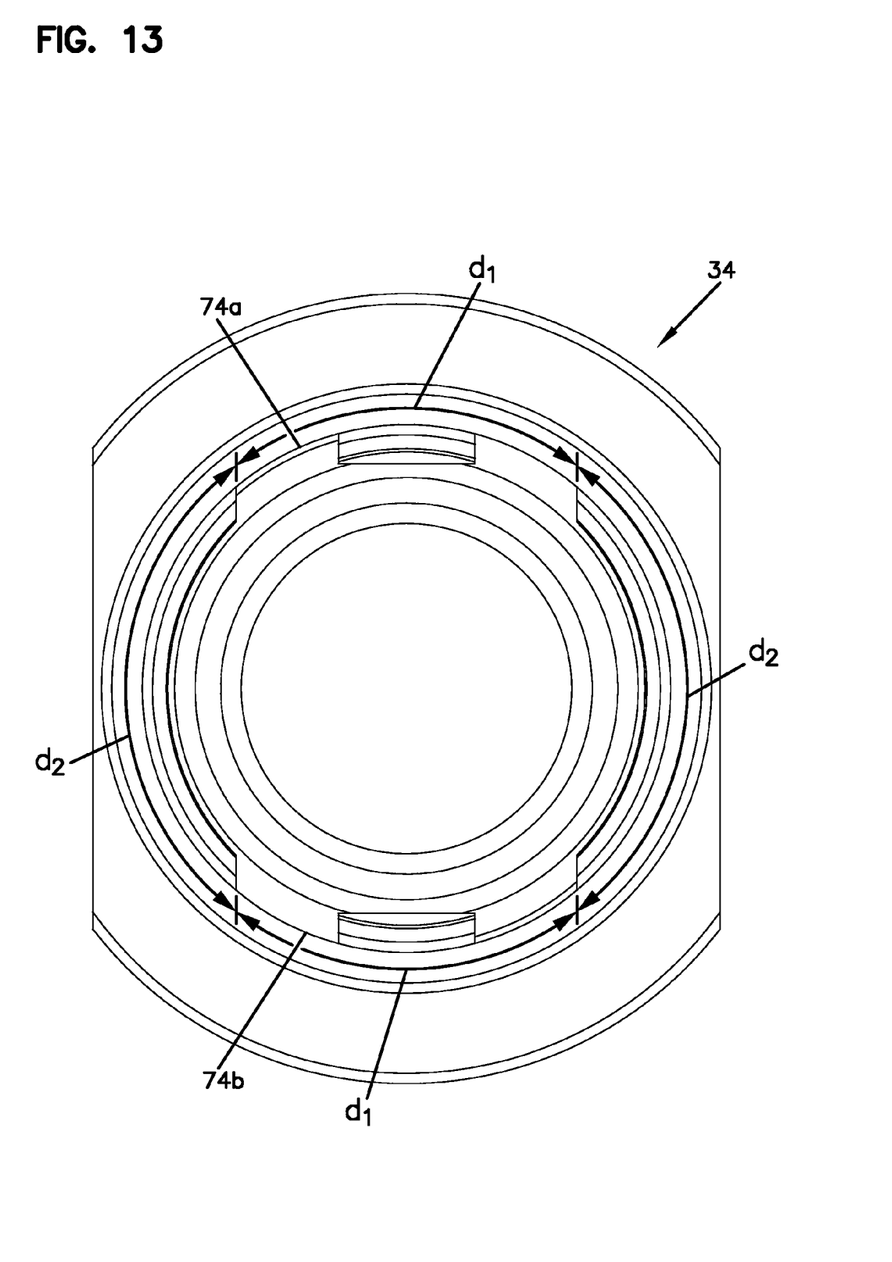
FIG. 13 is a front end view of the rear insert of the fiber optic connector of FIG. 1.

Referring to FIGS. 7 and 13, the distal end 60 of the rear insert 34 includes catches 74 arranged in first and second pairs 74a, 74b positioned on diametrically opposite sides of the rear insert 34 at the distal end 60. The catches 74 project outwardly from a main body of the rear insert 34. Tab receptacles 75 are defined between the catches of the first pair 74a and between the catches 74 of the second pair 74b. The first and second pairs 74a, 74b of catches 74 define circumferential dimensions d1 that are slightly smaller than the gap widths G. Circumferential dimensions d2 are defined between the first and second pairs 74a, 74b. The circumferential dimensions d2 are slightly larger than the structure lengths L. The catches 74 define proximally facing retention surfaces 77.

The catch pairs 74a, 74b of the rear insert 34 and retention structures 45, 46 of the front connector housing 32 cooperate to define an axial insertion/retention interface and a rotational locking/unlocking interface between the front connector housing 32 and the rear insert 34. The axial insertion/retention interface can be configured to allow the rear insert 34 to be inserted into and removed from the proximal end 18 of the connector housing 32 along the axis 47 when the rear insert 34 is positioned in a first rotational position (see FIGS. 1, 2 and 8) about the axis 47 relative to the connector housing 32. The axial insertion/retention interface can be arranged and configured to prevent the rear insert 34 from being withdrawn from the proximal end 18 of the connector housing 32 along the axis 47 when the rear insert 34 has been inserted into the proximal end 18 of the connector housing 32 and then rotated relative to the connector housing 32 about the axis 47 from the first rotational position to a second rotational position (see FIGS. 9-11). For example, interference between retention surfaces 77 of the catches 74 and the retentions shoulders 48 of the retention structures 45, 46 prevents the rear insert 34 from being proximally withdrawn from the connector housing 32.

The rotational locking/unlocking interface can be configured to allow the rear insert 34 to rotate relative to the connector housing 32 about the axis 47 when the rear insert 34 is positioned in a first axial position (see FIGS. 8 and 9) along the axis 47 relative to the connector housing 32. The rotational locking/unlocking interface can be arranged and configured to prevent the rear insert 34 from rotating relative to the connector housing 32 about the axis 47 when the rear insert 34 is moved proximally from the first axial position along the axis 47 to a second axial position (see FIGS. 10 and 11) along the axis 47 while the rear insert 34 is in the second rotational position. For example, interference between the catch pairs 74a, 74b and the tabs 50 of the retention structures 45, 46 prevents the rear insert 34 from rotating relative to the connector housing 32.

To assemble the connector 20, the ferrule assembly 22 is initially loaded into the interior 40 of the front connector housing 32 by inserting the ferrule assembly 22 through the rear opening 38 of the front connector housing 32. The optical fiber 36 can be secured within the ferrule 26 prior to loading the ferrule assembly 22 into the front connector housing 32. Also, the spring 30 and rear insert 34 can be slid over the optical fiber 36 prior to securing the optical fiber 36 in the ferrule 26.

Once the ferrule assembly 22 has been loaded into the front connector housing 32, the rear insert 34 is aligned along the axis 47 and oriented in the first rotational position relative to the front connector housing 32 (see FIG. 2). When so oriented, the catch pairs 74a, 74b of the rear insert 34 align with the gaps 52, 53 between the retention structures 45, 46 of the connector housing 32. Also, the circumferential dimensions d2 of the rear insert 34 align with the retention structures 45, 46 of the connector housing. The rear insert 34 is then moved distally along the axis 47 relative to the connector housing 32 such that the distal end 60 of the rear insert 34 is inserted through the rear opening 38 of the connector housing 32 and into the interior 40 of the connector housing 32. In the first rotational position, internal clearance is provided between the connector housing 32 and the rear insert 34 to allow the rear insert 34 to be inserted without obstruction from the retention structures 45, 46. For example, as the distal end 60 of the rear insert 34 is inserted into the connector housing 32, the catch pairs 74a, 74b pass through the gaps 52, 53 and the retention structures 45, 46 pass through the circumferential dimensions d2. Distal insertion of the rear insert 34 is continued until the rear insert 34 reaches a first axial position (see FIG. 8). In the first axial position of FIG. 8, a spring stop 64 engages the spring 30 such that the spring is compressed and the proximally facing retention surfaces 77 of the catches 74 are positioned distally beyond the tabs 50 of the retention structures 45, 46.

Figure 8:
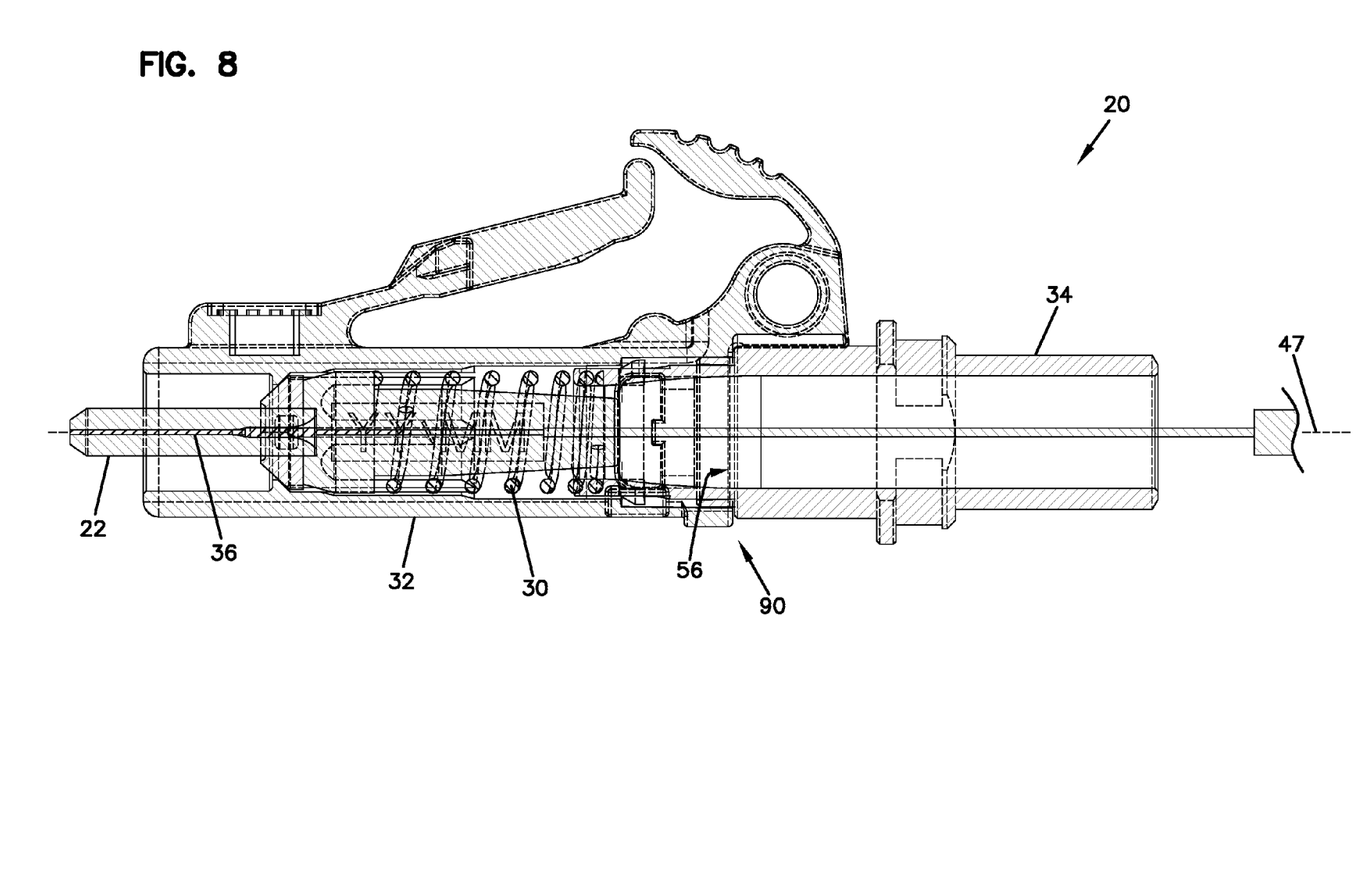
FIG. 8 is a cross-sectional view of the fiber optic connector of FIG. 1 showing the rear insert inserted within the front connector housing and oriented in a first rotational position relative to the connector housing.
Figure 9:
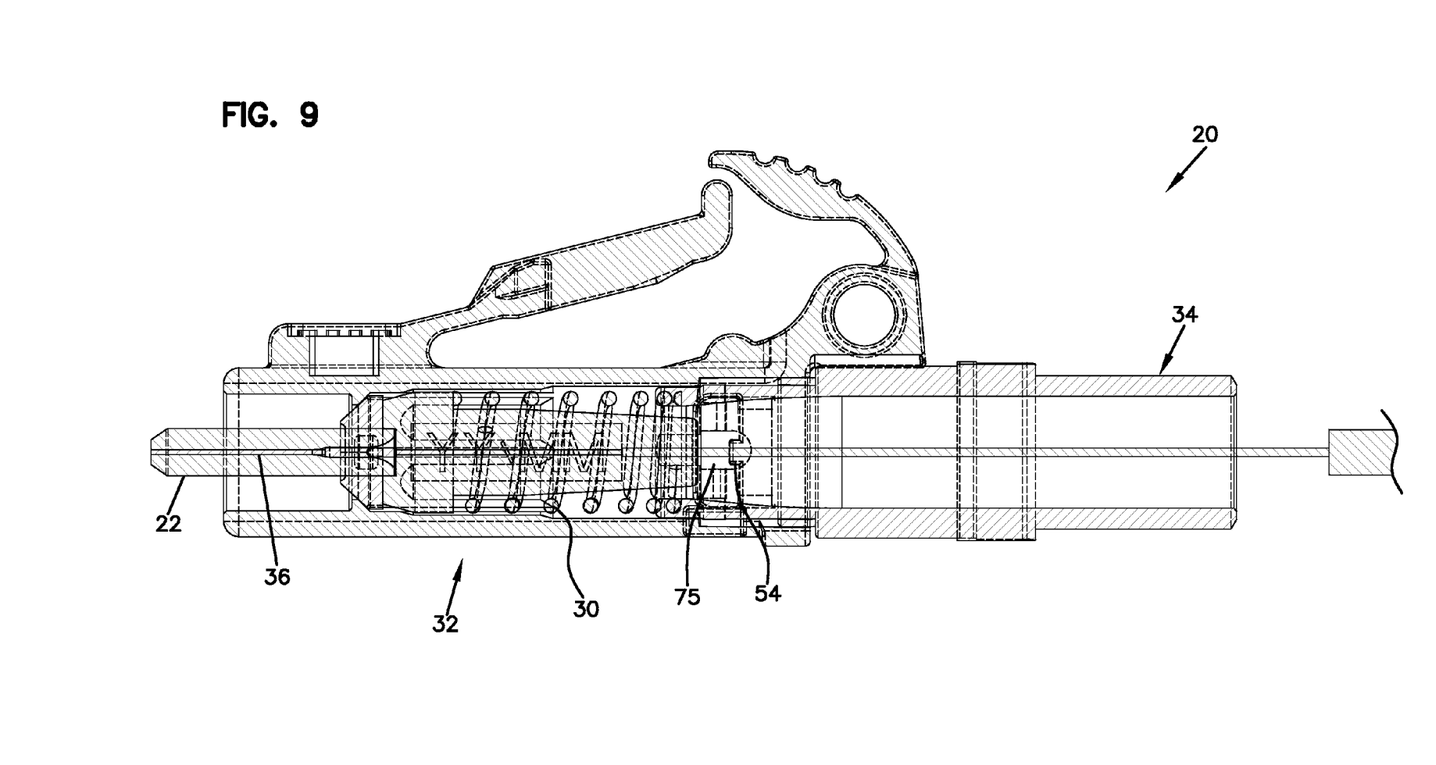
FIG. 9 is a cross-sectional view of the fiber optic connector of FIG. 1 showing the rear insert inserted within the front connector housing and oriented in a second rotational position relative to the connector housing.

While the rear insert 34 is retained in the first axial position of FIG. 8, the rear insert 34 is rotated about the axis 47 from the first rotational position of FIG. 8 to a second rotational position shown at FIG. 9. In one example, the rotational distance between the first and second rotational positions is about 90 degrees. In the second rotational position, the tab receptacles 75 align with the tabs 50 of the retention structures 54, 56, and the proximally facing retention surfaces 77 of the catches 74 oppose the distally facing retention shoulders 48 of the retention structures 45, 46. After rotating the rear insert 34 to the second rotational position, the rear insert 34 can be released thereby allowing the spring 30 to push the rear insert proximally from the first axial position of FIGS. 8 and 9 to a second axial position (see FIG. 10). In the second axial position, the tabs 50 fit within the tab receptacles 75 such that contact between the tabs 50 and the catches 74 prevent the rear insert 34 from rotating relative to the front connector housing 32. Also, the distally facing retention shoulders 48 of the left and right retention structures 45, 46 engage the proximally facing retention surfaces 77 of the catches 74 to prevent the rear insert 34 from moving proximally relative to the front connector housing 32.

Figure 10:
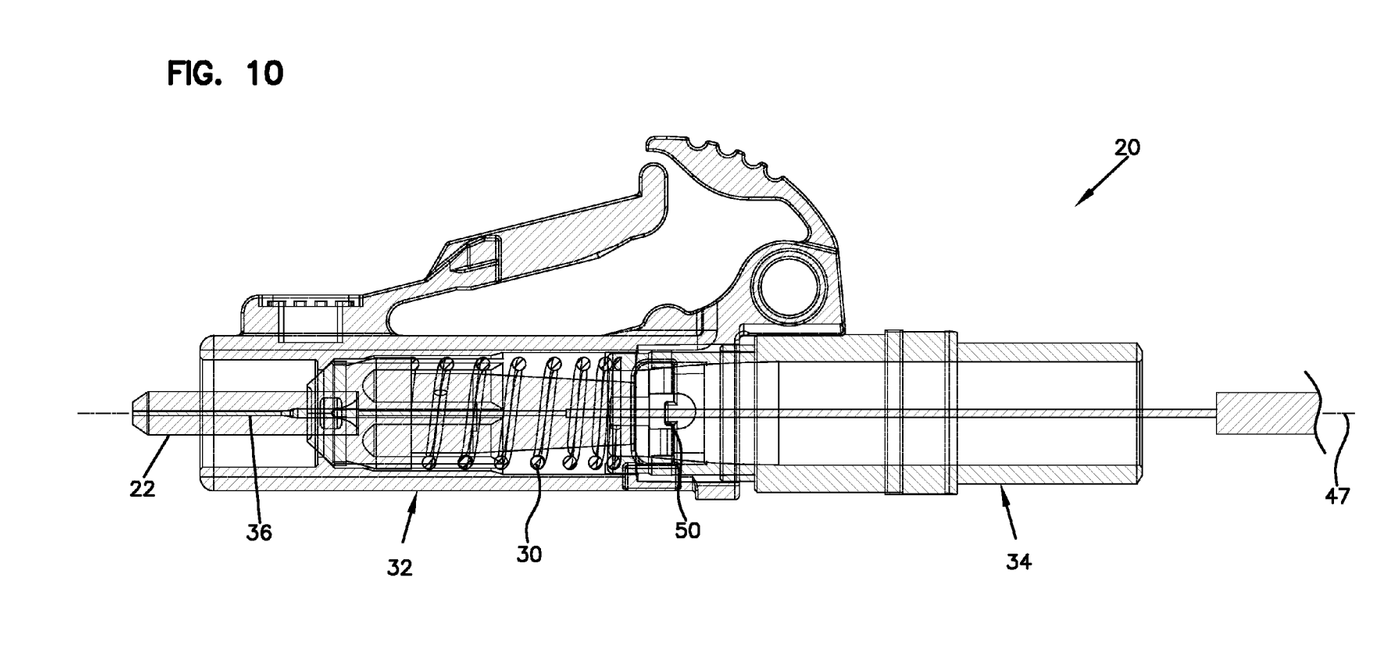
FIG. 10 is a cross-sectional view of the fiber optic connector of FIG. 1 showing the rear insert inserted within the front connector housing and oriented in the second rotational position relative to the connector housing and proximally retracted to an interlocked/installed position with the front connector housing.
Figure 11:
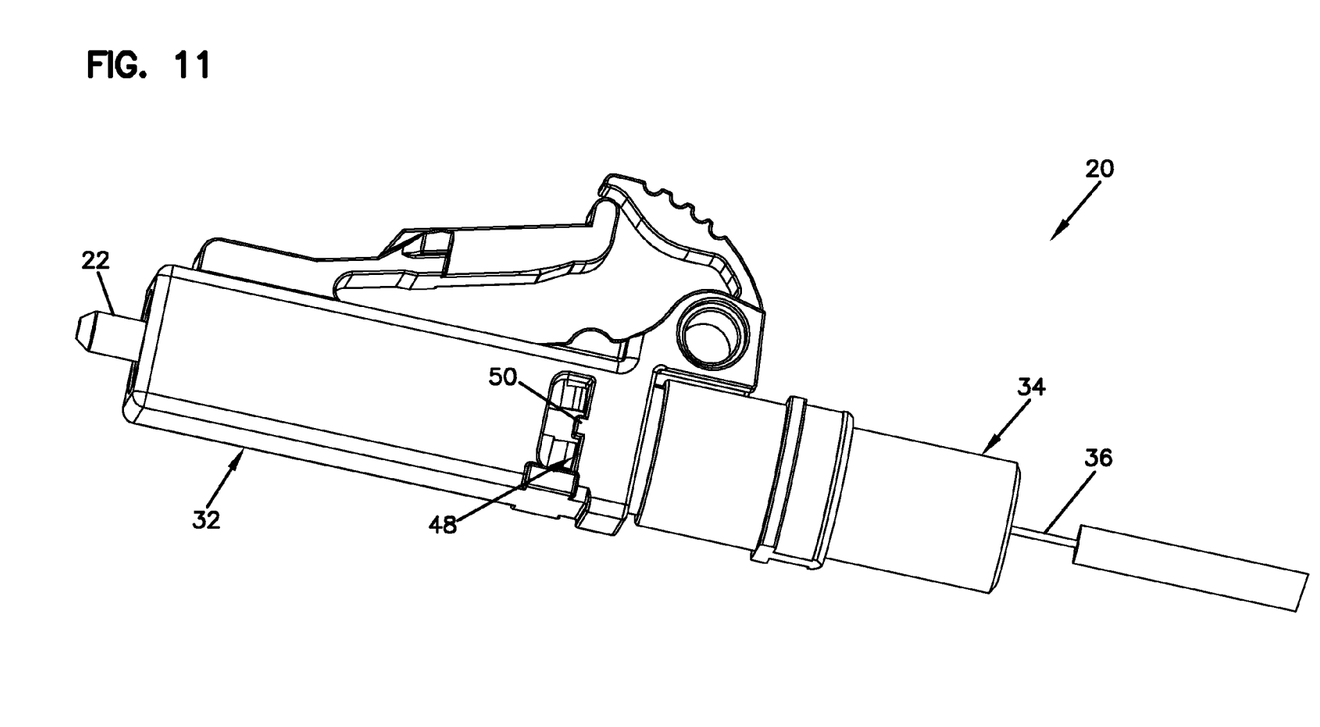
FIG. 11 is a perspective view of the fiber optic connector of FIG. 1 with the rear insert in the position of FIG. 10.

The position of the rear insert 34 as shown at FIGS. 10 and 11 can be referred to as an installed position. Once the rear insert 34 is in the installed position, side inserts 100 (see FIG. 4) can be loaded into the left and right openings 42, 44 to axially lock the rear insert 34 in the installed position. For example, the side inserts 100 can engage the rear insert 34 to prevent the rear insert 34 from moving in a distal direction relative to the front connector housing 32. In one example, the side inserts 100 include ramp surfaces 102 (see FIG. 4) that engage corresponding ramp surfaces 104 (see FIG. 7) on the catches 74 of the rear insert 34. In other examples, a curable material can be injected or otherwise provided in the left and right openings 42, 44 for locking the rear insert 34 in the installed position. In one example, the curable material can include an epoxy that is curable by exposure to ultraviolet radiation.

Referring again to FIG. 7, the rear insert 34 includes a flange 106 that is centrally located along the length of the insert 34. The flange 106 can be used to facilitate tooling of the rear insert 34 and can also be used to facilitate grasping the rear insert 34 during insertion of the rear insert 34 into the front connector housing 32. The rear insert 34 includes a proximal extension 108 that is generally cylindrical in shape. When the fiber optic connector 20 is used to terminate a fiber optic cable, strength members of the fiber optic cable can be crimped or otherwise anchored to the rear extension 108. Additionally, in certain examples, a boot or other type of strain-relief structure can be press fit over the rear extension 108. The boot can provide cable strain relief at the interface between the cable and the proximal end 18 of the rear insert 34.

From the forgoing detailed description, it will be evident that modifications and variations can be made without departing from the spirit and scope of the disclosure.

What is claimed is:

1. A fiber optic connector comprising:
a connector housing having a distal end and a proximal end, the distal end forming a plug adapted for insertion within a receptacle of a fiber optic adapter;
a ferrule assembly positioned within the connector housing, the ferrule assembly including a ferrule for supporting an optical fiber, a ferrule hub attached to a base of the ferrule and a spring for biasing the ferrule and the hub in a distal direction relative to the connector housing;
a rear insert that mounts within the proximal end of the connector housing for capturing the ferrule assembly within the connector housing, the rear insert including a main body and a pair of catches that project outwardly from the main body, wherein a tab receptacle is defined between the catches, and wherein the catches define proximally facing retention surfaces;
wherein the connector housing including an internal retention structure including a rail defining a distally facing retention shoulder and a tab that projects distally from the rail; and
wherein when the rear insert is in an installed position within the connector housing, the tab fits within the tab receptacle to limit relative rotation between the connector housing and the rear insert, and the proximally facing retention surfaces of the catches engage the distally facing retention shoulder of the rail to limit proximal movement of the rear insert relative to the connector housing.

2. The fiber optic connector of claim 1, wherein the connector housing includes two of the internal retention structures positioned on diametrically opposite sides of the connector housing.

3. The fiber optic connector of claim 2, wherein the rear insert includes two of the pairs of catches positioned on diametrically opposite sides of the main body of the rear insert.

4. The fiber optic connector of claim 1, wherein the connector housing defines a side opening that receives a side insert for securing the rear insert in the installed position.

5. The fiber optic connector of claim 1, wherein the connector housing defines a side opening for receiving a curable material that secures the rear insert in the installed position.

6. A method for assembling the connector of claim 1, the method comprising:
loading the ferrule assembly into the connector housing through the proximal end of the connector housing;
aligning the rear insert along a central axis of the connector housing and positioning the rear insert in a first rotational position relative to the connector housing;
inserting the rear insert into the connector housing through the proximal end of the connector housing by moving the rear insert along the central axis while the rear insert is in the first rotational position relative to the connector housing;
continuing the insertion step until the rear insert reaches a first axial position where the proximally facing retention surfaces of the catches are positioned distally with respect to the tab of the internal retention structure;
rotating the rear insert about the central axis from the first rotational position to a second rotation position while the rear insert is in the first axial position, wherein the tab receptacle of the rear insert aligns with the tab of the connector housing when the rear insert is in the second rotational position; and
moving the rear insert proximally from the first axial position to a second axial position while the rear insert is in the second rotational position thereby causing the tab of the connector housing to fit within the tab receptacle of the rear insert.

7. The method of claim 1, wherein the rear insert is rotated about 90 degrees between the first and second rotational positions.

8. A fiber optic connector comprising:
a connector housing having a distal end and a proximal end, the distal end forming a plug adapted for insertion within a receptacle of a fiber optic adapter;
a rear insert that mounts within the proximal end of the connector housing;
an axial insertion/retention interface defined between the connector housing and the rear insert, the axial insertion/retention interface being configured to allow the rear insert to be inserted into and removed from the proximal end of the connector housing along an insertion axis when the rear insert is positioned in a first rotational position about the insertion axis relative to the connector housing, the axial insertion/retention interface also being configured to prevent the rear insert from being withdrawn from the proximal end of the connector housing along the insertion axis when the rear insert has been inserted into the proximal end of the connector housing and then rotated relative to the connector housing about the insert axis from the first rotational position to a second rotational position; and
a rotational locking/unlocking interface defined between the connector housing and the rear insert, the rotational locking/unlocking interface being configured to allow the rear insert to rotate relative to the connector housing about the insertion axis when the rear insert is positioned in a first axial position along the insertion axis relative to the connector housing, and the rotational locking/unlocking interface being configured to prevent the rear insert from rotating relative to the connector housing about the insertion axis when the rear insert is moved from the first axial position along the insertion axis to a second axial position along the insertion axis while the rear insert is in the second rotational position;
wherein the rotational locking/unlocking interface includes a tab defined by one of the connector housing and the rear insert that fits circumferentially between catches defined by the other of the connector housing and the rear insert.

9. The fiber optic connector of claim 8, wherein the axial insertion/retention interface includes a distally facing retention surface defined by the connector housing that opposes a proximally facing retention surface defined by the rear insert.

10. The fiber optic connector of claim 9, wherein the catches are provided on the rear insert and the tab is provided on the connector housing, wherein the catches define the proximally facing retention surface, and wherein the tab projects distally from a rail on the connector housing, the rail defining the distally facing retention surfaces.

* * * * *